(12) United States Patent
Aggarwal et al.

(10) Patent No.: US 11,775,578 B2
(45) Date of Patent: *Oct. 3, 2023

(54) TEXT-TO-VISUAL MACHINE LEARNING EMBEDDING TECHNIQUES

(71) Applicant: Adobe Inc., San Jose, CA (US)

(72) Inventors: Pranav Vineet Aggarwal, San Jose, CA (US); Zhe Lin, Fremont, CA (US); Baldo Antonio Faieta, San Francisco, CA (US); Saeid Motiian, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,317

(22) Filed: Aug. 10, 2021

(65) Prior Publication Data

US 2021/0365727 A1 Nov. 25, 2021

Related U.S. Application Data

(63) Continuation of application No. 16/426,264, filed on May 30, 2019, now Pat. No. 11,144,784.

(51) Int. Cl.
| | |
|---|---|
| *G06K 9/62* | (2022.01) |
| *G06K 9/72* | (2006.01) |
| *G06F 16/535* | (2019.01) |
| *G06N 20/00* | (2019.01) |
| *G06V 30/262* | (2022.01) |

(Continued)

(52) U.S. Cl.
CPC ........ *G06F 16/535* (2019.01); *G06F 18/2148* (2023.01); *G06F 18/40* (2023.01); *G06N 20/00* (2019.01); *G06V 10/82* (2022.01); *G06V 10/945* (2022.01); *G06V 30/1916* (2022.01);

(Continued)

(58) Field of Classification Search
CPC .... G06K 9/6253; G06K 9/6257; G06K 9/726; G06N 20/00; G06F 16/535; G06F 3/0482
See application file for complete search history.

(56) References Cited

U.S. PATENT DOCUMENTS

| | | |
|---|---|---|
| 8,928,813 B2 | 1/2015 | Liu |
| 11,144,784 B2 | 10/2021 | Aggarwal et al. |

(Continued)

FOREIGN PATENT DOCUMENTS

WO 2020131140 A1 6/2020

OTHER PUBLICATIONS

"Examination Report No. 1", AU Application No. 2020202021, dated Oct. 21, 2021, 5 pages.

(Continued)

*Primary Examiner* — David F Dunphy
(74) *Attorney, Agent, or Firm* — FIG. 1 Patents

(57) ABSTRACT

Text-to-visual machine learning embedding techniques are described that overcome the challenges of conventional techniques in a variety of ways. These techniques include use of query-based training data which may expand availability and types of training data usable to train a model. Generation of negative digital image samples is also described that may increase accuracy in training the model using machine learning. A loss function is also described that also supports increased accuracy and computational efficiency by losses separately, e.g., between positive or negative sample embeddings a text embedding.

18 Claims, 11 Drawing Sheets

(51) Int. Cl.
  *G06F 18/40* (2023.01)
  *G06F 18/214* (2023.01)
  *G06V 30/19* (2022.01)
  *G06V 10/82* (2022.01)
  *G06V 10/94* (2022.01)
  *G06F 3/0482* (2013.01)

(52) U.S. Cl.
  CPC .. *G06V 30/19147* (2022.01); *G06V 30/19173* (2022.01); *G06V 30/274* (2022.01); *G06F 3/0482* (2013.01)

(56) References Cited

U.S. PATENT DOCUMENTS

| | | | |
|---|---|---|---|
| 11,604,822 B2 | 3/2023 | Aggarwal et al. | |
| 11,605,019 B2 | 3/2023 | Aggarwal et al. | |
| 2015/0339405 A1 | 11/2015 | Vora et al. | |
| 2015/0347528 A1 | 12/2015 | Jugel et al. | |
| 2016/0328776 A1 | 11/2016 | Amacker | |
| 2017/0206465 A1* | 7/2017 | Jin | G06N 3/08 |
| 2017/0330054 A1* | 11/2017 | Fu | G06N 3/0454 |
| 2019/0188285 A1 | 6/2019 | Scheau et al. | |
| 2019/0205333 A1 | 7/2019 | Piramuthu et al. | |
| 2019/0325342 A1 | 10/2019 | Sikka et al. | |
| 2019/0347357 A1* | 11/2019 | Murali | G06F 16/583 |
| 2020/0380027 A1 | 12/2020 | Aggarwal et al. | |
| 2020/0380298 A1 | 12/2020 | Aggarwal et al. | |
| 2020/0380403 A1 | 12/2020 | Aggarwal et al. | |
| 2021/0019342 A1 | 1/2021 | Peng et al. | |
| 2023/0185844 A1 | 6/2023 | Aggarwa et al. | |

OTHER PUBLICATIONS

"Foreign Office Action", GB Application No. 2004709.8, dated Dec. 3, 2021, 10 pages.
"Notice of Acceptance", AU Application No. 2020202021, dated Oct. 29, 2021, 4 pages.
"Restriction Requirement", U.S. Appl. No. 16/426,369, dated Nov. 12, 2021, 7 pages.
Lee, Kuang-Huei et al., "Stacked Cross Attention for Image-Text Matching", Proceedings of the European Conference on Computer Vision (ECCV) [retrieved Dec. 3, 2021]. Retrieved from the Internet <https://openaccess.thecvf.com/content_ECCV_2018/papers/Kuang-Huei_Lee_Stacked_Cross_Attention_ECCV_2018_paper.pdf>, Oct. 6, 2018, 16 pages.
U.S. Appl. No. 16/426,298, "Notice of Allowance", U.S. Appl. No. 16/426,298, dated Oct. 11, 2022, 8 pages.
U.S. Appl. No. 16/426,369, "Notice of Allowance", U.S. Appl. No. 16/426,369, dated Oct. 18, 2022, 15 pages.
"Foreign Office Action", GB Application No. 2004709.8, dated Apr. 8, 2022, 8 pages.
"Non-Final Office Action", U.S. Appl. No. 16/426,369, dated Apr. 22, 2022, 9 pages.
"Pre-Interview First Office Action", U.S. Appl. No. 16/426,298, dated May 18, 2022, 3 pages.
U.S. Appl. No. 16/426,369, "Corrected Notice of Allowability", U.S. Appl. No. 16/426,369, dated Jan. 19, 2023, 3 pages.
"Combined Search and Examination Report", GB Application No. 2004709.8, dated Sep. 10, 2020, 6 pages.
"Corrected Notice of Allowability", U.S. Appl. No. 16/426,264, dated Sep. 14, 2021, 2 pages.
"Final Office Action", U.S. Appl. No. 16/426,264, dated Jan. 27, 2021, 21 pages.
"First Action Interview Office Action", U.S. Appl. No. 16/426,264, dated Nov. 18, 2020, 21 pages.
"Foreign Office Action", GB Application No. 2004709.8, dated Jul. 7, 2021, 3 pages.
"Notice of Allowance", U.S. Appl. No. 16/426,264, dated May 27, 2021, 7 pages.
"Pre-Interview First Office Action", U.S. Appl. No. 16/426,264, dated Oct. 2, 2020, 21 pages.
"Pre-Interview First Office Action", U.S. Appl. No. 16/426,369, dated Jul. 21, 2021, 4 pages.
U.S. Appl. No. 18/104,848, "Non-Final Office Action", U.S. Appl. No. 18/104,848, dated Jun. 8, 2023, 11 pages.

* cited by examiner

TEXT-TO-VISUAL MACHINE LEARNING EMBEDDING TECHNIQUES

RELATED APPLICATIONS

This Application claims priority as a continuation of U.S. patent application Ser. No. 16/426,264, filed May 30, 2019, and titled "Text-to-Visual Machine Learning Embedding Techniques," the entire disclosure of which is hereby incorporated by reference.

BACKGROUND

Digital image search systems are confronted with numerous technical challenges in order to return accurate search results, especially in instances involving text-based searches. Conventional digital image search systems, for instance, rely on image tags that are associated with the digital images, which may be specified manually or automatically inferred, e.g., using machine-learning based image tagging techniques. Therefore, in order to perform a search, text included in a text query is matched with tags associated with the digital images. However, these conventional systems and techniques are prone to error, especially when the text query includes a significant amount of text and often due to a lack of ability to support flexible language description variations.

In one conventional example, a text query is received that includes the text "person holding a dog sitting on a chair by the beach." Conventional digital image search systems that are tag based typically return search results having any one of the tags that are also included in the text query. Therefore, users of these conventional systems are typically confronted with a search result that includes people, dogs (which may include a canine or food item), chairs, or a beach, alone. This search result is also intermixed with sub-combinations of these tags, e.g., people with dogs, person eating a hot dog, chairs on beach, and so forth. Further, some conventional systems (e.g., stock image-based search systems) may even fail to return a result due to a length of the text query. Therefore, conventional digital image search systems may require a user to manually navigate through hundreds of digital images in a search result to find a digital image of interest, may force the user to initiate a multitude of searches having different text combinations, and so on. This results in user frustration due to inefficient navigation and well as inefficient use of network and computational resources to communicate, perform, and repeat these searches by a digital image search system.

SUMMARY

Text-to-visual machine learning embedding techniques are described that overcome the challenges of conventional techniques in a variety of ways. In one example, this is performed by generating training data, using a training data generation module, that increases accuracy of a model trained using machine learning. Query-based training data, for instance, may be generated based on a text query used to initiate a search of digital images and a selection of a digital image from the search result. In this way, association of the text query with the digital image may be determined for a multitude of digital images and text. The use of query-based training data may also be expanded through use of title-based training data as part of multi-task learning, which improves training accuracy by limiting noise in the query-based training data and supports use of long text sequences.

The training data generation module is also configured to generate negative digital image samples that increase accuracy in training the model using machine learning. This is performed by generating a negative digital image sample having a semantic and/or visual meaning that is similar to a positive digital image sample, but does not have the exact same components of the positive digital image sample.

In one example, this is performed by selecting the negative digital image sample from a subset of digital images that do not have at least one item of text, excluding stop words, also included with text associated with a positive digital image sample. In another example, this is performed by selecting the negative digital image sample from a subset of digital images that do not have each item of text, excluding stop words, also included with text associated with the positive digital image sample. This training data may then be used to generate a model supporting a single unified text-and-digital image embedding space that is configured to treat text and digital images as the same entity, and thus overcomes the limitations of conventional techniques that are solely text based.

A machine-learning training module is also described that utilizes a loss function to train the model. The loss function supports increased accuracy and computational efficiency over conventional loss functions by treating a loss calculated between a positive image embedding generated from a positive digital image sample and a text embedding calculated based on text associated with the positive digital image sample separately from a negative image embedding generated from a negative digital image sample and the text embedding. This permits a distance between the positive image embedding and the text embedding to reduce over time (during training) while a distance between the negative image embedding and the text embedding increases, thereby increasing model accuracy over conventional training techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
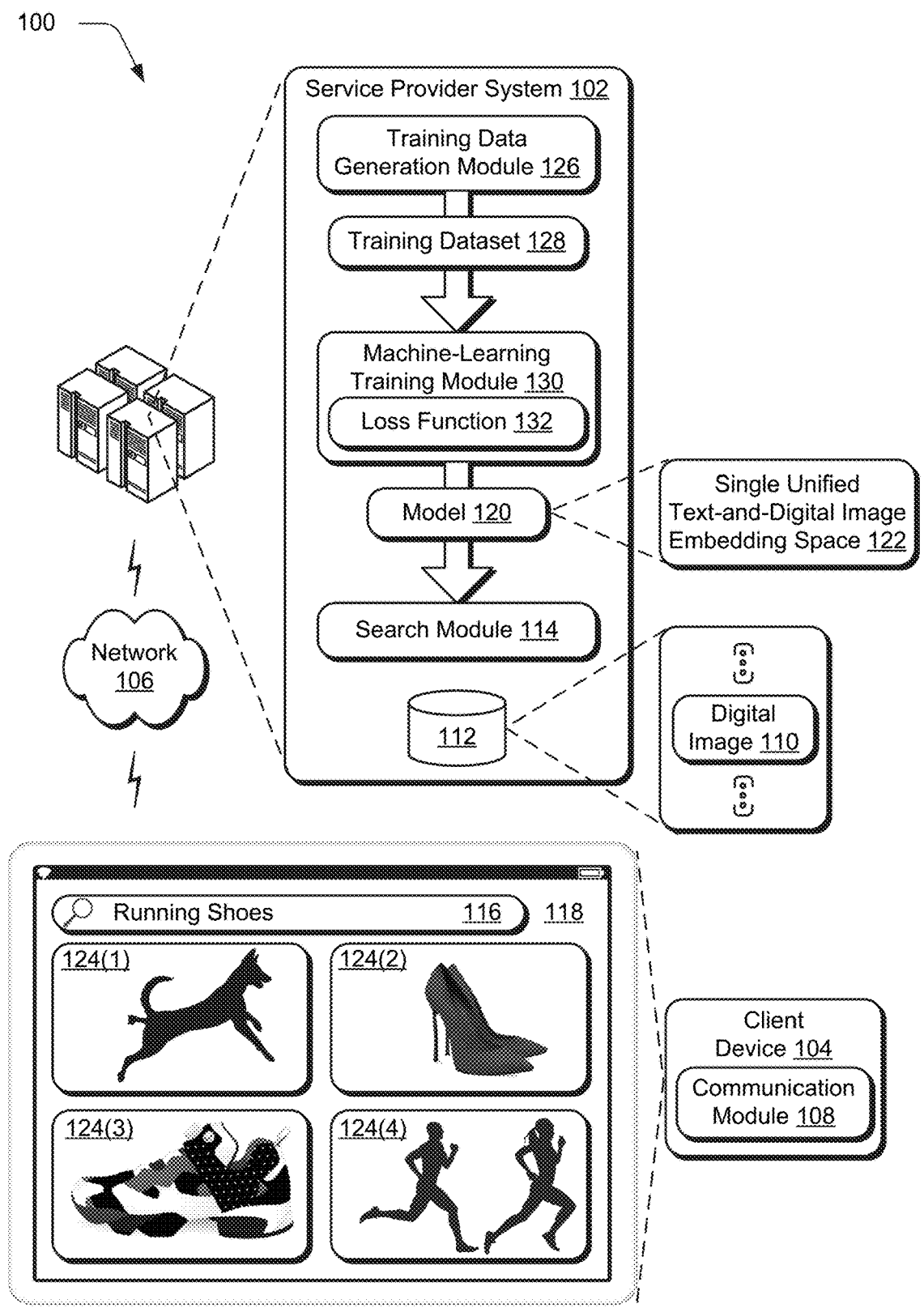
FIG. 1 is an illustration of a digital medium environment in an example implementation that is operable to employ text-to-visual machine learning embedding techniques described herein.

Digital image search systems are confronted with numerous technical and computational challenges in order to return accurate search results, especially in instances involving text-based searches. In order to perform a search using a conventional digital image search system, text included in the text query is matched with tags associated with the digital images. However, these conventional systems and techniques are prone to error, especially when the text query includes a significant amount of text. This is often due to a lack of ability of conventional systems to support flexibility on variations of language descriptions (e.g., a "hot dog" as a food item and a "hot dog" as a panting dog) as well as lack of an ability to address how text is arranged in a sequence.

Therefore, conventional image search systems may require a user to navigate through hundreds of digital images in a search result to find a digital image of interest, may force the user to initiate a multitude of searches having different text combinations, and so on. This results in user frustration due to inefficient navigation and well as inefficient use of network and computational resources to communicate and perform these searches. This challenge is further exacerbated by a reliance of text used to express the text query as matching an underlying meaning of text of the tag used to identify the image, which may be difficult to achieve in some instances, e.g., in describing emotions invoked by a scene in a digital image.

Accordingly, text-to-visual (i.e., semantic/visual) machine learning embedding techniques are described that overcome the challenges of conventional systems and techniques. This includes techniques to generate training data and well as training techniques that are usable to support mapping of a digital image and text into a single unified embedding space as well as support loss functions that overcome conventional challenges.

A training dataset is generated by the training data generation module using a plurality of digital images and associated text. In this instance, the associated text includes text queries used to locate respective digital images, e.g., as part of an image search by a search engine, stock image system, and so forth. In this way, the training data generation module may collect a multitude of digital images that is user selected as corresponding to text used to locate those digital images in an efficient manner. This overcomes challenges of conventional techniques in which availability of accurate training data is limited (e.g., a limited number of samples) and expensive as typically involving manual tagging, which may suffer inaccuracies due to inconsistent application of tags.

The training data generation module may also be configured to generate a title-based training dataset, e.g., to support multi-task training along with the query-based training dataset. The title-based training dataset includes digital images and titles (e.g., image captions) associated with the digital images. The title-based training dataset is used to address long sentences and remove user query noise from the query-based training dataset (e.g., for "clicked images" that do not correspond to the text query. Multi-task training implemented through use of the title-based training dataset with the query-based training dataset improves accuracy and computational efficiency of model training as part of machine learning as further described in the following discussion.

The training data generation module may also employ techniques to generate negative digital image samples. In machine learning as implemented by a machine-learning training module, positive digital image samples are used as instances of a "correct" correspondence with text, whereas a negative digital image sample is used to increase discrimination by the model, e.g., is selected in a way that the negative digital image sample does not belong in a same category with the positive digital image sample. This is performed by generating a negative digital image sample having a semantic and/or visual meaning that is similar to a positive digital image sample, but does not have the exact same components of the positive digital image sample.

In one example, this is performed by the training data generation module by selecting the negative digital image sample from a subset of digital images that do not have at least one item of text, excluding stop words, also included with text associated with a positive digital image sample. In another example, this is performed by selecting the negative digital image sample from a subset of digital images that do not have each item of text, excluding stop words, also included with text associated with the positive digital image sample.

The machine-learning training module, as part of training the model using machine learning, may also implement a loss function that further increases accuracy and computational efficiency of the model. Continuing with the example above, the machine-learning training module trains the model using a positive digital image sample, a negative digital image sample, and text associated with the positive digital image sample. A text embedding is generated the text using machine learning by the machine-learning training module, e.g., through a recurrent neural network. A positive image embedding is also generated from the positive digital image sample and a negative image embedding generated from the negative digital image sample, e.g., through convolutional neural network encoders.

The loss function is configured in this example to evaluate a loss between the text embedding and the positive image embedding separately from a loss between the text embedding and the negative image embedding. This causes the positive image embedding to have increased similarity with respect to the text embeddings (and therefore cluster together) and the negative image embedding to have increased dissimilarity with respect to the text embedding. This improves an ability of the model to discriminate between these samples, i.e., improves model accuracy. In this way, accuracy of the model is increased over conventional loss functions that did not support such an ability to separately address these losses.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the text-to-visual machine learning embedding techniques described herein. The illustrated environment 100 includes a service provider system 102 and a client device 104 that are communicatively coupled via a network 106. The service provider system 102 and the client device 104 may be implemented using a variety of different configurations of computing devices.

A computing device, for instance, may be configured as a desktop computer, a laptop computer, a mobile device (e.g., assuming a handheld configuration such as a tablet or mobile phone as illustrated for the client device 104), and so forth. Thus, the computing device may range from a full resource device with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as shown for the service provider system 102 and as described further in relation to FIG. 11.

The client device 104 as illustrated includes a communication module 108 (e.g., browser or network-enabled application) that is executable using a computer-readable storage medium and processing system to access functionality of the service provider system 102 via the network 106. This functionality may take a variety of forms, such as for a search of digital images 110 illustrated as stored in a storage device 112 using a search module 114. Other examples of features that may be supported by the functionality described herein include machine translation, text retrieval, speech recognition, text summarization, and so forth. Further, although this functionality is illustrated as implemented by the service provider system 102, the functionality may be implemented in whole in in part locally by the client device 104.

A communication module 108, for instance, may receive a text query 116 via a user interface 118 for "running shoes." The text query 116 is communicated via the network 106 and processed by a search module 114. The search module 114 employs a model 120 trained using machine learning to implement a single unified text-and-digital image embedding space 122 to perform the search. This single unified text-and-digital image embedding space 122 overcomes the limitations of conventional solely text-based embedding techniques when used to address a relationship between text and digital images, e.g., to gain visual intuition regarding "what" is expressed in the text.

As previously described, conventional search techniques are prone to error, especially when the text query includes a significant amount of text. This is often due to a lack of ability to support flexibility on variations of language descriptions as well as variations of language descriptions for different objects. In the illustrated example, for instance, a text query "running shoes" may be matched by conventional systems to digital images having tags of either pivot of text (i.e., a text term that is not a stop word and used as a basis to perform a search), examples of which include a digital image 124(1) of a running dog, a digital image 124(3) of a shoe, and a digital image 124(4) of people running along with an actual goal of the search, e.g., a digital image 124(3) of a running shoe. Stop words are commonly used words that are filtered as not being relevant to a search, e.g., "and," "the," "a," "an," and so on as being generic.

In the techniques described herein, however, a single unified text-and-digital image embedding space 122 is generated for a model 120 as part of machine learning that overcomes these challenges with increased accuracy and computational efficiency over conventional techniques. For example, a search for "golden bowl" using the model 120 would limit and even eliminate a number of instances of inclusion of digital images of goldfish, gold ingots, and so forth as typically encountered in conventional techniques.

To do so, the digital medium environment 100 described herein implements a variety of functionality, which may be performed together or in sub-combinations as further described in respective sections of the following discussion. In the illustrated example, the service provider system 102 employs a training data generation module 126 to generate a training dataset 128 that is used to train the model 120 by a machine-learning training module 130 using a loss function 132. The training dataset 128 may be based on a variety of different types of text that may be associated with digital images.

In the Query-based Training Dataset section that follows in the subsequent discussion, the training dataset 128 is generated by the training data generation module 126 using a plurality of digital images and associated text. In this instance, the associated text includes text queries used to locate respective digital images. For example, the training data generation module 126 may receive data that includes a text query (e.g., running shoes) and a digital image included in a digital image search result that is user selected, e.g., digital image 124(3). In this way, the training data generation module 126 may collect a multitude of digital images and text that is user selected as corresponding to those digital images in an efficient manner. This overcomes challenges of conventional techniques in which availability of accurate training data is limited (e.g., a limited number of samples) and expensive as typically involving manual tagging, which may suffer inaccuracies due to inconsistent application of tags.

The training data generation module 126 may also be configured to generate a title-based training dataset as part of the training dataset 128 as also described in the Query-based Training Dataset section, e.g., as part of multi-task training. The title-based training dataset includes digital images and titles (e.g., image captions) associated with the digital images. The title-based training dataset, for instance, may be used in combination with the query-based training dataset to train the model 120 to address long sentences, text sequences, and remove user query noise from the query-based training dataset, e.g., for "clicked images" that do not correspond to the text query. Use of the title-based training dataset along with the query-based training dataset improves accuracy and computational efficiency of the model 120 as further described in the corresponding section.

As part of generating the training dataset 128, the training data generation module 126 may also employ techniques to generate negative digital image samples. In machine learning as implemented by the machine-learning training module 130, positive digital image samples are used as instances of a "correct" correspondence with text, whereas a negative digital image sample is used to increase discrimination by the model 120, e.g., is selected in a way that the negative digital image sample does not belong in a same category with the positive digital image sample.

As further described in the Negative Digital Image Sample Generation section, the training data generation module 126 may generate the negative digital image samples automatically and without user intervention in a manner that increases accuracy of the model 120. To do so, the training data generation module 126 selects a positive digital image sample from a plurality of digital images that has associated text, e.g., text queries or titles as described above.

In one instance, the training data generation module 126 generates a subset from a plurality of digital images that includes digital images from the plurality of digital images that do not have any of the terms associated with the associated text of the positive digital image sample. For example, suppose the positive digital image sample has associated text of "man on a motorbike." Digital images are then filtered to form a subset having digital images that are not associated with either "man" or "motorbike." The subset is then used to select a negative digital image sample. The training data generation module 126, for instance, may select a digital image in the subset, automatically and without user intervention, that is the "closest" (through comparison of respective embeddings) to the positive digital image sample, e.g., by a least squared distance. This may be performed, for instance, for the Query-based Training Data described above. In this way, the negative digital images sample may increase an ability of the model 120 to discriminate between "good" and "bad" examples of digital images and text associations.

In another example, even "harder" negative digital image samples may be generated by the training data generation module 126, automatically and without user intervention. To do so in this example, the training data generation module 126 also generates a subset from a plurality of digital images that do not include digital images from the plurality of digital images that have each of the terms, excluding stop words (i.e., are "pivots"), in the text associated with the positive digital image sample. The training data generation module 126 then selects the negative digital image sample from this subset. For example, suppose again that the positive digital image sample has associated text of "man on a motorbike." Digital images are then filtered from the plurality of digital images that have both "man" or "motorbike," with the remaining digital images forming the subset. The subset is then used to select a negative digital image sample. This may be performed, for instance, for title-based training data which typically includes significant amounts of text as described above. As a result, the model 120 is further able to discriminate between "good" and bad" examples of digital image and text associations as part of training.

The machine-learning training module 130 may also implement a loss function 132 as part of training and use of the model 120 that further increases accuracy and computational efficiency of the model 120, as described in the Loss Function section in the following discussion. Continuing with the example above, the machine-learning training module 130 trains the model 120 using a positive digital image sample, a negative digital image sample, and text associated with the positive digital image sample. A text embedding is generated from the text using machine learning by the machine-learning training module 130, e.g., through a recurrent neural network. A positive image embedding is also generated from the positive digital image sample and a negative image embedding generated from the negative digital image sample, e.g., through convolutional neural network encoders.

The loss function 132 is configured in this example to evaluate a loss between the text embedding and the positive image embedding separately from a loss between the text embedding and the negative image embedding. This causes the positive image embedding to have increased similarity with respect to the text embeddings (and therefore cluster together) and the negative image embedding to have increased dissimilarity with respect to the text embedding during training, e.g., to "tighten" the clusters. This improves an ability of the model 120 to discriminate between these samples, i.e., improves model 120 accuracy. In this way, accuracy of the model is increased over conventional loss functions that did not support such an ability to separately address these losses as further described in the corresponding section in the following discussion.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Query-based Training Dataset

Figure 2:
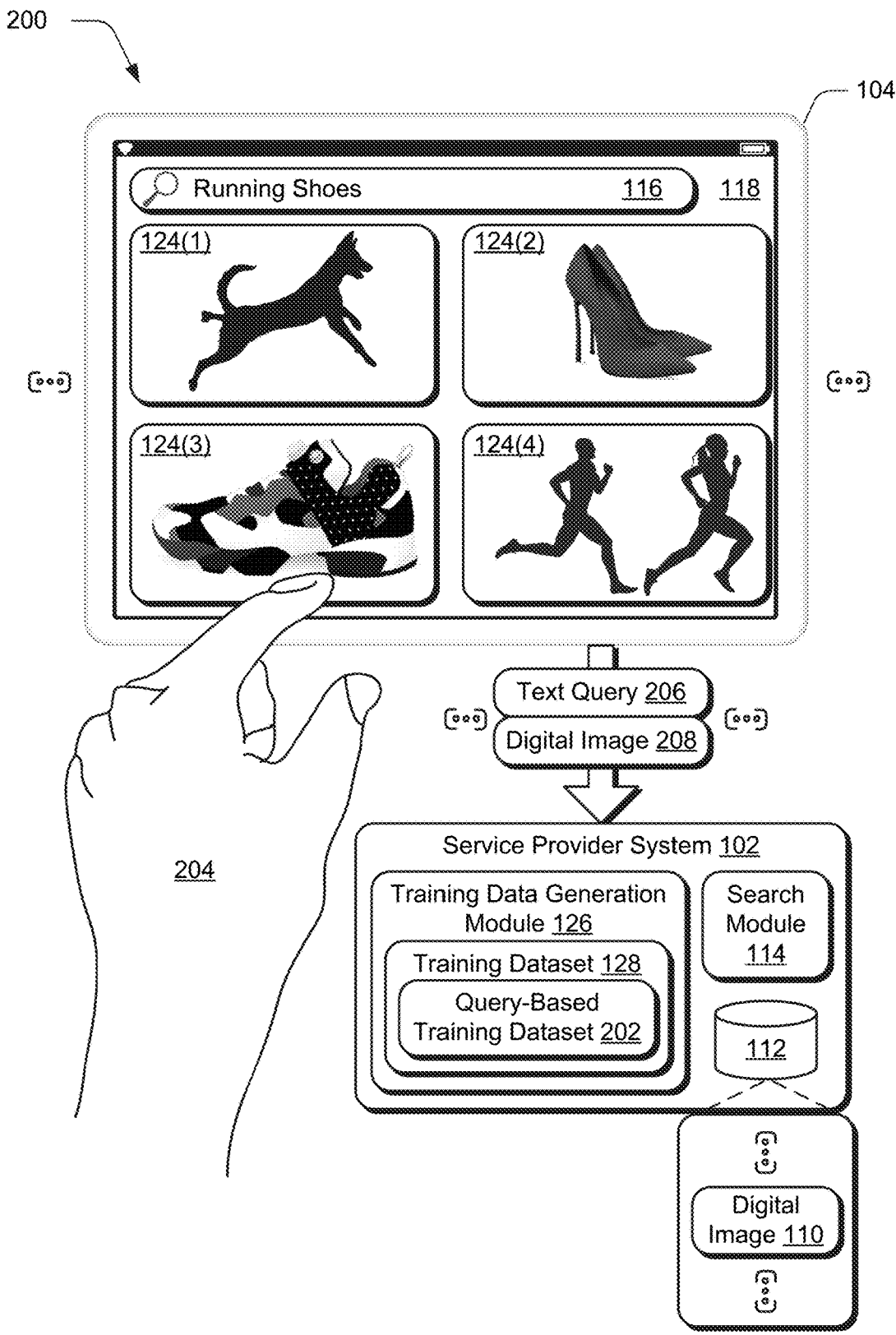
FIG. 2 depicts a system in an example implementation in which a query-based training dataset is generated by a service provider system based on text queries and digital images associated with the text queries.
Figure 3:
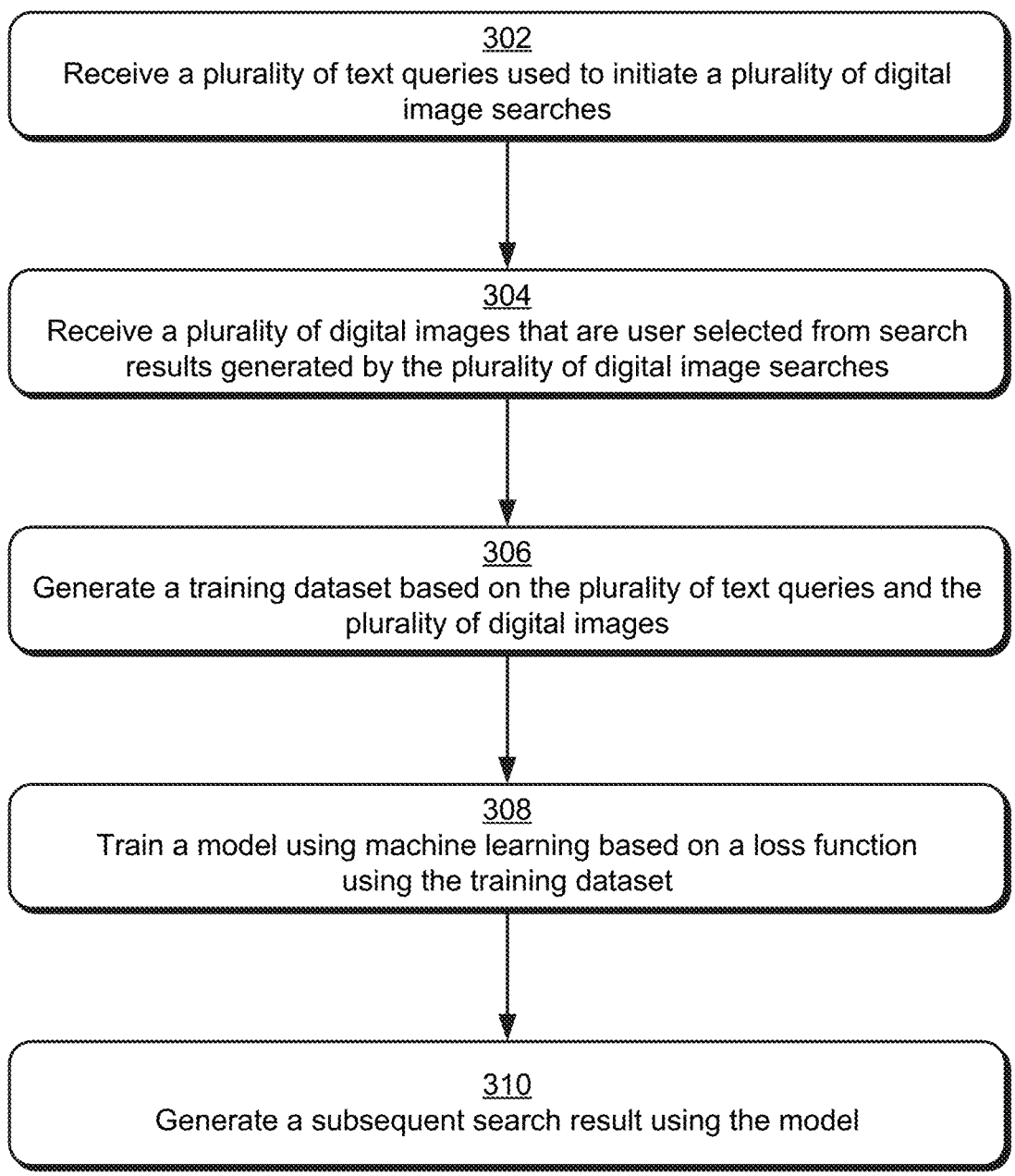
FIG. 3 is a flow diagram depicting a procedure in an example implementation in which a training dataset is used to train a model using machine learning, the training dataset generated based on digital images and text queries used to locate the digital images as part of a search.

FIG. 2 depicts a system 200 in an example implementation in which a query-based training dataset 202 is generated by a service provider system 102 based on text queries and digital images associated with the text queries. FIG. 3 depicts a procedure 300 in an example implementation in which a training dataset is used to train a model using machine learning. The training dataset is generated based on digital images and text queries used to locate the digital images as part of a search.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 1-3.

Accuracy of training data is one of the driving factors in training a model 120 using machine learning to accurately perform a function. Another driving factor is obtaining a sufficient quantity of accurate training data. In practice, however, this may be difficult. For example, conventional techniques used to tag digital images often relied on users to manually indicate which objects are included in digital images, characteristics of the object, emotions evoked by the objects, etc. However, this may vary from person to person, and is also expensive when attempting to object a sufficient quantity of digital images and associated text to perform machine learning.

Accordingly, the system 200 of FIG. 2 is configured to generate a query-based training dataset 202 based on digital image searches. In the illustrated example, the service provider system 102 includes a search module 114 that is configured to support a search of digital images 110 from a storage device 112, e.g., either locally or remote to the service provider system 102. The service provider system 102, for instance, may support a storage device 112 containing digital images 110 as "stock," access to which may be gained freely, purchased for a fee (e.g., subscription or "by item"), and so forth. In another instance, the service provider system 102 implements the search module 114 part of a search engine system that locates digital images maintained by third-party systems. Other implementation examples are also contemplated.

In the illustrated example, a text query 116 is input via a user interface 118 of the client device 104 of "running shoes" as previously described in relation to FIG. 1. In response, a search result is received by the client device 104 from the service provider system 102 that includes digital images 124(1)-124(4) as displayed in the user interface 118. A user input is then received via the user interface 118, illustrated as a tap gesture detected through touchscreen functionality of the client device 104, that selects digital image 124(3). This is used by the training data generation module 126 to determine association of the digital image 124(3) with text of the text query 116. Thus, the training data generation module 126 may use this correspondence to generate a query-based training dataset 202 based on data 206 describing the text query 116 and data 208 describing the digital images 124(3) selected in the search result. In this way, the training data generation module 126 may obtain a multitude of digital images associated with a multitude of different text and as such overcomes the limitations of conventional training data.

The training data generation module 126, for instance, may receive a plurality of text queries used to initiate a plurality of digital images searches (block 302) from a multitude of client devices 104 as illustrated in FIG. 3. The training data generation module 126 also receives a plurality of digital images that are user selected (e.g., via gesture, cursor-control device, spoken utterance) from search result generated by the plurality of digital image searches (block 304). Thus, the training data generation module 126 receives the plurality of digital images and text queries associated, respectively, with the plurality of digital images. In this way, the digital images and text may cover a wide range of digital image and text associations that may be difficult if not impossible to obtain using conventional manual tagging approaches and even conventional automated techniques which may support limited instances of text.

A training dataset 128 is generated by the training data generation module 126 based on the plurality of text queries and the plurality of digital images (block 306). The plurality of digital images, for instance, may be considered positive digital image samples of the associated text queries. The training data generation module 126 may also generate negative digital image samples to use as part of training, further discussion of which may found in the Negative Digital Image Sample Generation section in the following discussion. In the illustrated example, this results in a query-based training dataset 202.

As illustrated in FIG. 1, the training dataset 128 is passed from the training data generation module 126 to a machine-learning training module 130. The machine-learning training module 130 is configured to train the model 120 using machine learning based on a loss function 132 through use of the training dataset (block 308). The model 120, once trained, may then be used by the search module 114 to generate a subsequent search result (block 310), e.g., responsive to a subsequent search query.

The training data generation module 126 may also be employed to generate the training dataset 128 using other sources of digital images and associated text. For example, the query-based training dataset 202 may include "noise" that is caused by selection of digital images that do not accurately reflect text in the text query. This may be caused by user interest in a search result of a digital image that does not accurately correspond to the text query. A user, for instance, may input the text query "running shoes" and receive as part of a search result, a digital image 124(1) of a running dog that is a breed that is of interest to the user. Consequently, user selection of the digital image 124(1) does not accurately reflect association of the text query with the digital image, but rather indicates user interest in the image. Therefore, data describing an association between the text query 116 and the digital image 124(1) may introduce "noise." In other instances, a search module 114 may not return results for text queries that contain a multitude of text, e.g., as may occur in some stock digital image systems.

Accordingly, the training data generation module 126 may also obtain digital images associated with text that may be used to supplement the training dataset 128. One such example includes digital images having associated titles (e.g., captions) used by the training data generation module 126 to generate a title-based training dataset 422. Titles associated with digital images, in practice, may include a significant amount of text used to describe objects, characteristics of objects, locations, emotions invoked, and so forth of a digital image. By including a title-based training dataset 422 with the query-based training dataset 202, the training dataset 128 may address noise introduced in the query-based training dataset 202, support use of "long sentences," address text sequences, and is thus able to understand text queries with increased accuracy and efficiency, e.g., to support both "girl cat" and "girl holding a cat" as text queries. Further discussion of generation of the training dataset 128 is included in the following section.

Negative Digital Image Sample Generation

Figure 4:
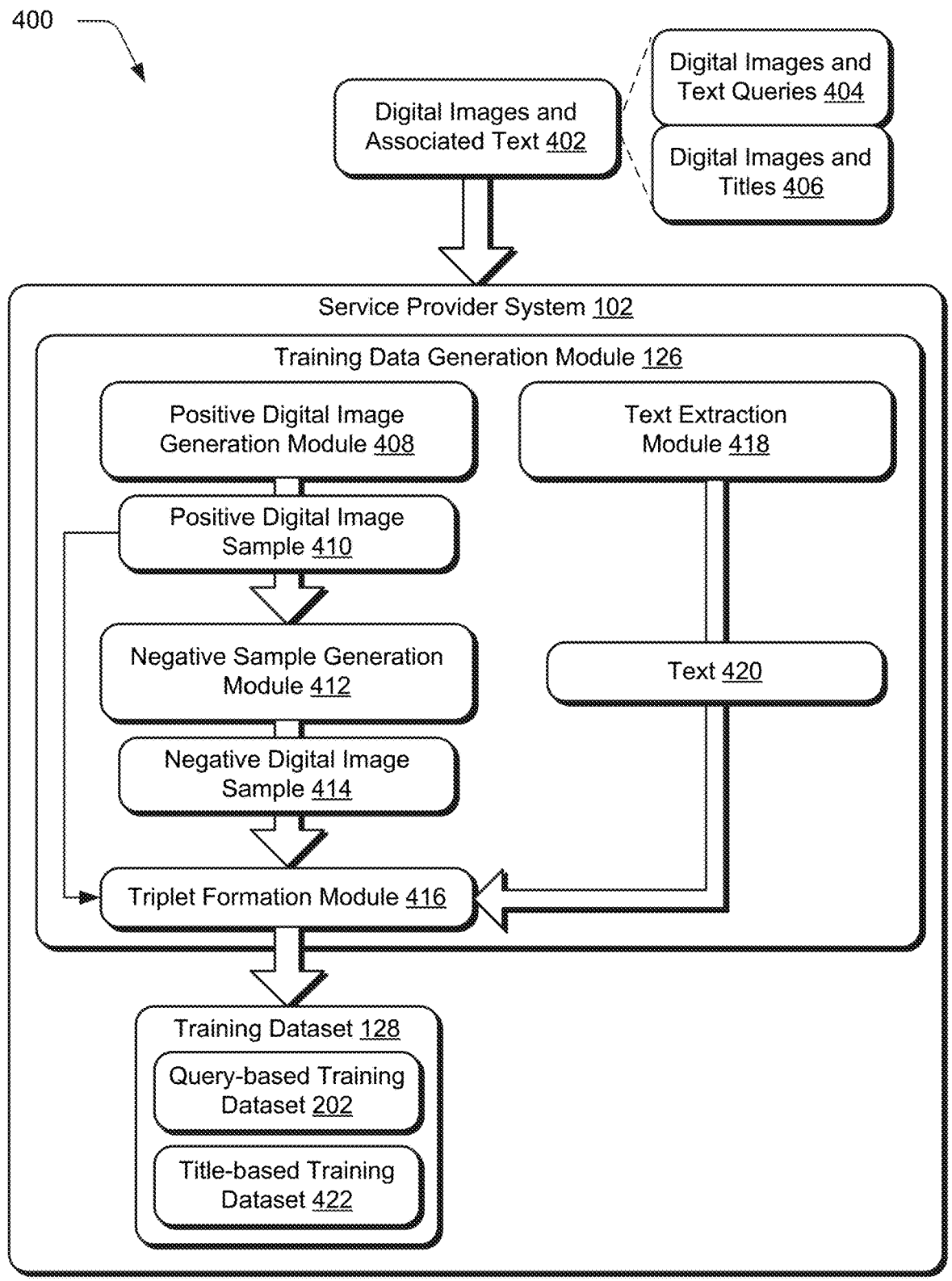
FIG. 4 depicts a system in an example implementation in which a training dataset is generated that includes negative digital images samples selected based on positive digital images samples and associated text.
Figure 5:
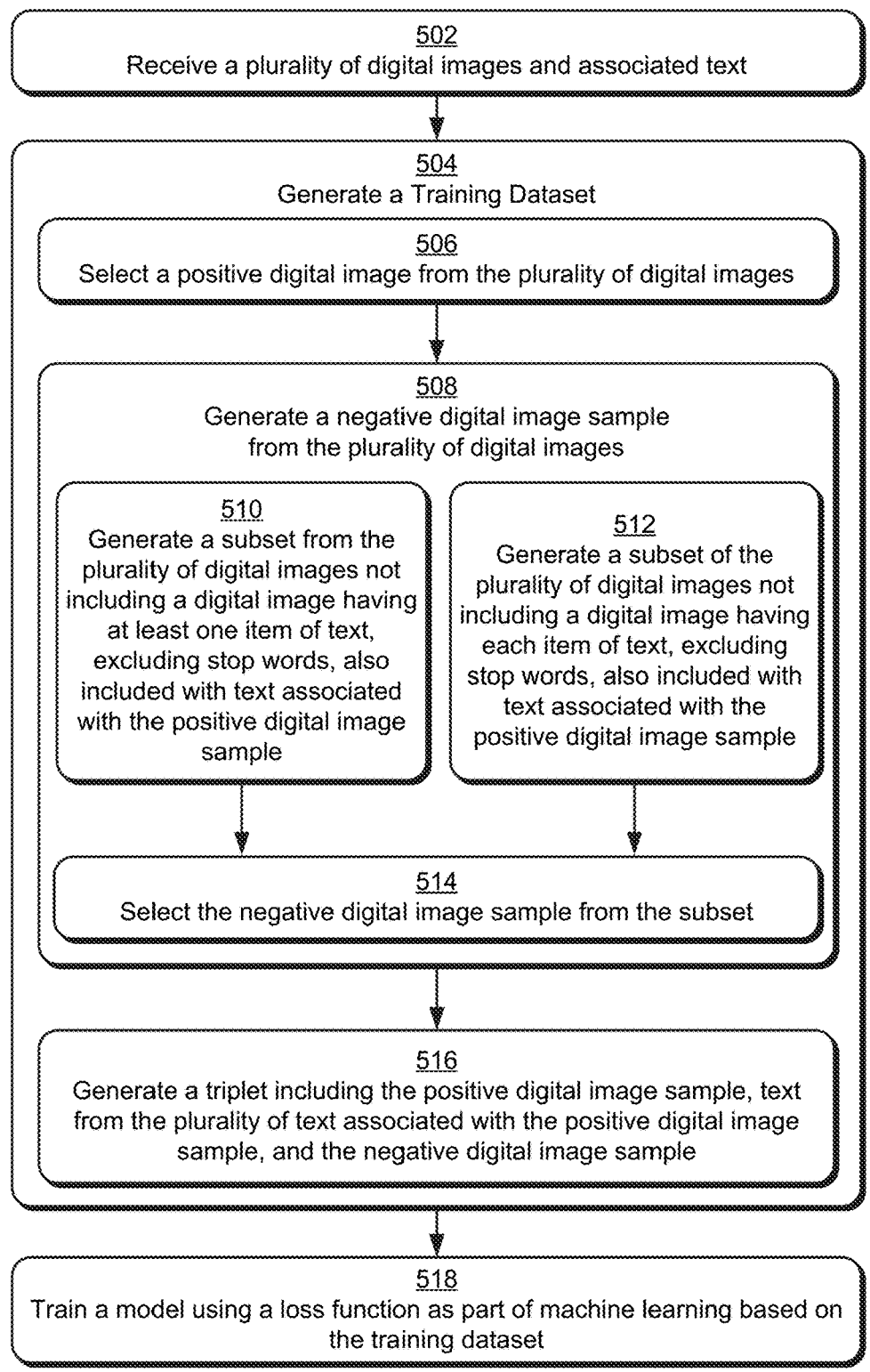
FIG. 5 is a flow diagram depicting a procedure in an example implementation in which negative digital image samples are generated based on a comparison of text associated the negative digital image samples and text associated with the positive digital image samples.

FIG. 4 depicts a system 400 in an example implementation in which a training dataset is generated that includes negative digital images samples selected based on positive digital images samples and associated text. FIG. 5 depicts a procedure 500 in an example implementation in which negative digital image samples are generated based on a comparison of text associated the negative digital image samples and text associated with the positive digital image samples.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 1, 4, and 5.

When training the model 120 by the machine-learning training module 130, positive and negative digital image samples are used as part of a triplet loss to adjust weights of neurons in a neural network of the model 120. This is performed to ensure that for an embedding space implemented by the model 120, examples (i.e., digital images) having the same or similar text are clustered close together in the embedding space (i.e., the single unified text-and-digital image embedding space 122) and examples having dissimilar text are not close together in the embedding space and causes formation of tighter clusters.

In this section, techniques are described to generate negative digital image samples that increase accuracy and computational efficiency in training the model 120 by the machine-learning training module 130. This is achieved by the training data generation module 126, automatically and without user intervention, by generating negative digital image samples that have a semantic and/or visual meaning similar to that of the positive digital image sample, but not exactly, and thus improves an ability of the model 120 to distinguish between these samples.

To begin, the training data generation module 126 receives a plurality of digital images and associated text 402 (block 502). This plurality may include digital images and text queries 404, digital images and titles 406, as well as other examples of digital image and text associations that may be used to generate the training dataset 128.

A training dataset 128 is then generated (block 504) by the training data generation module 126 automatically and without user intervention based on the digital images and associated text 402. First, a positive digital image sample 410 is selected by a positive digital image generation module 408 from the plurality of digital images (block 506). This may be performed by selecting any digital image from the digital images and associated text 402, through use of a queue, and so forth.

A negative digital image sample 414 is then generated by a negative sample generation module 412 from the digital images and associated text 402 based on the positive digital image sample 410. This may be performed in a variety of ways by the negative sample generation module 412, examples of which in the following include filtering the plurality of digital images 402.

In one example of filtering, a subset of the plurality of digital images is generated by the negative sample generation module 412. This is performed by removing digital images from the plurality of digital images 402 having at least one item of text, excluding stop words, also included with text associated with the positive digital image sample (block 510), with the remaining digital images forming the subset. For example, if text associated with the positive digital image sample is "man on a motorbike," removing stop words of "on" and "a" results in items of text of "man" and "motorbike," i.e., "pivots." Therefore, each digital image of the digital images 402 that is associated with text that includes either "man" or "motorbike" is removed to form the subset, i.e., the other images are filtered from the plurality of digital images 402.

The negative digital image sample 414 is then selected by the negative sample generation module 412 from the subset (block 514). The negative sample generation module 412, for instance, may select "N" negative samples based on a least squared distance from the positive digital image sample 410 using respective image embeddings generated using a convolutional neural network. This is an example of "hard" negative image selection, which in an implementation is used for generating a query-based training dataset 202 from digital images and text queries 404, which may be used as part of multi-task training as further described below.

In another example, a subset of the plurality of digital images is generated by the negative sample generation module 412 that does not include digital images having each item of text, excluding stop words, that is also included with text associated with the positive digital image sample 410 (block 512). In other words, digital images that do have each item of text are filtered from the plurality of digital images, with the remaining digital images forming the subset. The negative digital image sample 414 is again selected from the subset (block 514). Continuing with the previous example, if text associated with the positive digital image sample 410 is "man on a motorbike," removal of stop words of "on" and "a" results in items of text of "man" and "motorbike," i.e., the "pivots." The subset is then generated from the digital images and associated text 402 that remain that are not associated with text including both "man" and "motorbike." This is considered as generating an even "harder" negative sample and in an implementation is used for the digital images and titles 406 to generate a title-based training dataset 422 as part of multi-task training. This may be used, for instance, to address technical challenges in that an amount of text typically observed for titles that is greater than an amount of text typically observed for text queries and as a result this generates negative digital image samples 414 for titles that have increased robustness.

The negative digital image sample 414 is again selected by the negative sample generation module 412 from the subset (block 514) in this example. The negative sample generation module 412, for instance, may select "N" negative samples based on a least squared distance from the positive digital image sample 410 using respective image embeddings generated using a convolutional neural network (CNN).

A triplet is generated by a triplet formation module 416 as including the positive digital image sample 410, text 420 from the plurality of text associated with the positive digital image sample 410, and the negative digital image sample 414 (block 516). A text extraction module 418, for instance, may extract text 420 from the digital images and associated text 402 that corresponds to the positive digital image sample 410. In this way, the training data generation module 126 generates a training dataset 128 from the digital images and associated text 402, which may include a query-based training dataset 202 and a title-based training dataset 422 which are usable to train a model 120 using a loss function 132 as part of machine learning (block 518) as further described in the following section.

Loss Function

Figure 6:
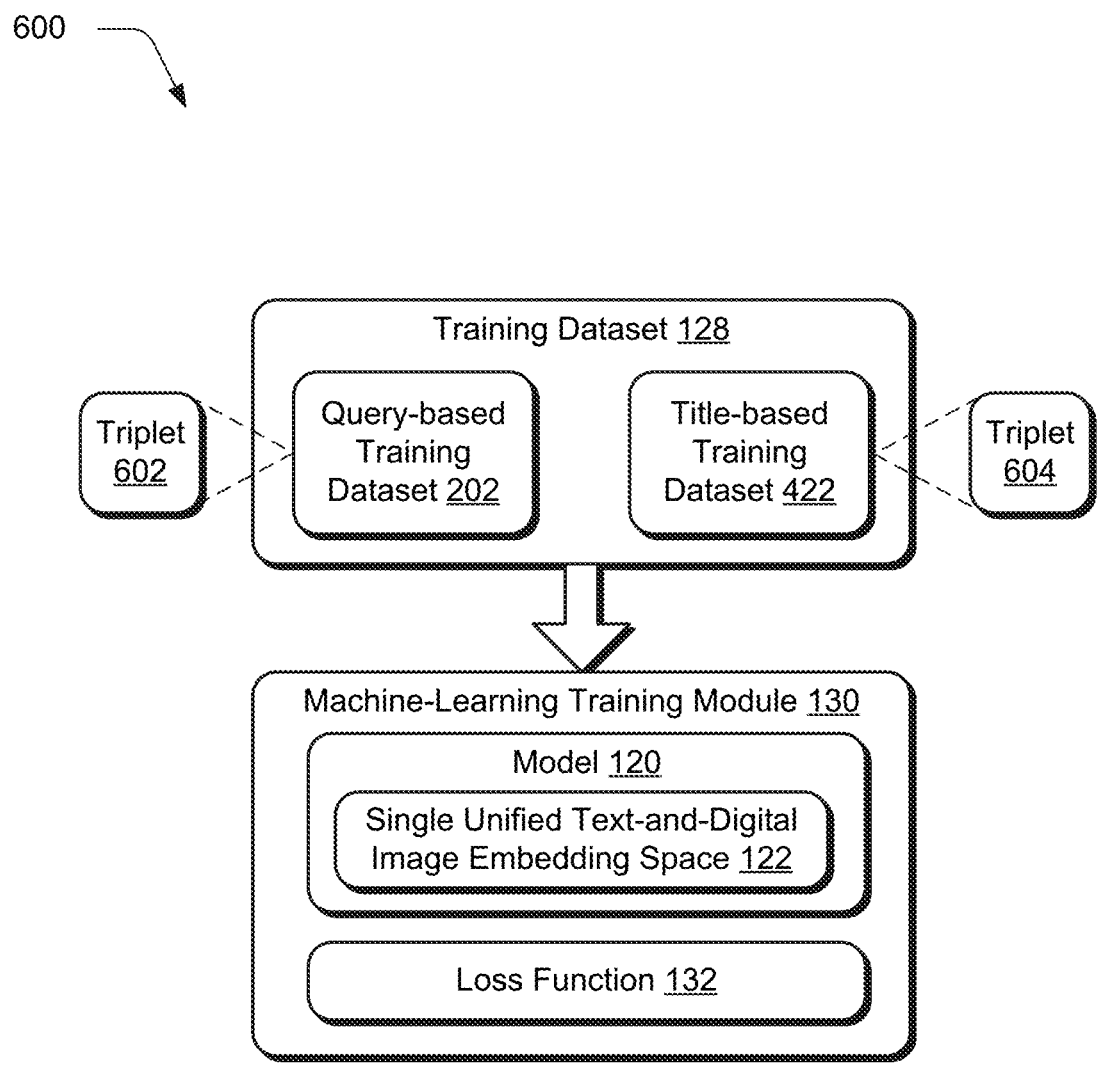
FIG. 6 depicts a system in an example implementation showing multi-task training of a model by a machine-learning training module using multi-task training based on a query-based training dataset and a title-based training dataset.
Figure 7:
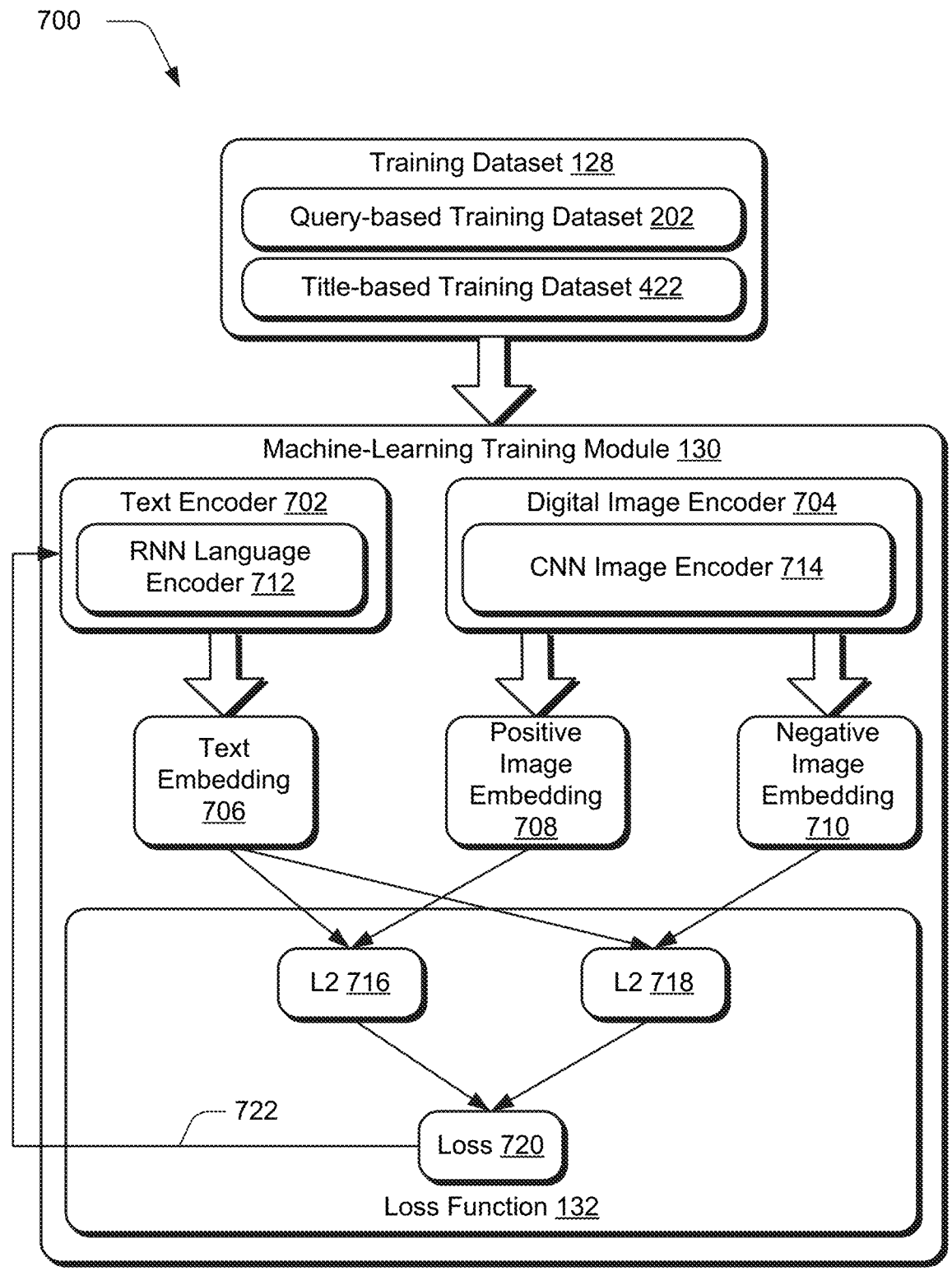
FIG. 7 depicts a system showing operation of the machine-learning training module in greater detail as generating embeddings and using the loss function.
Figure 8:
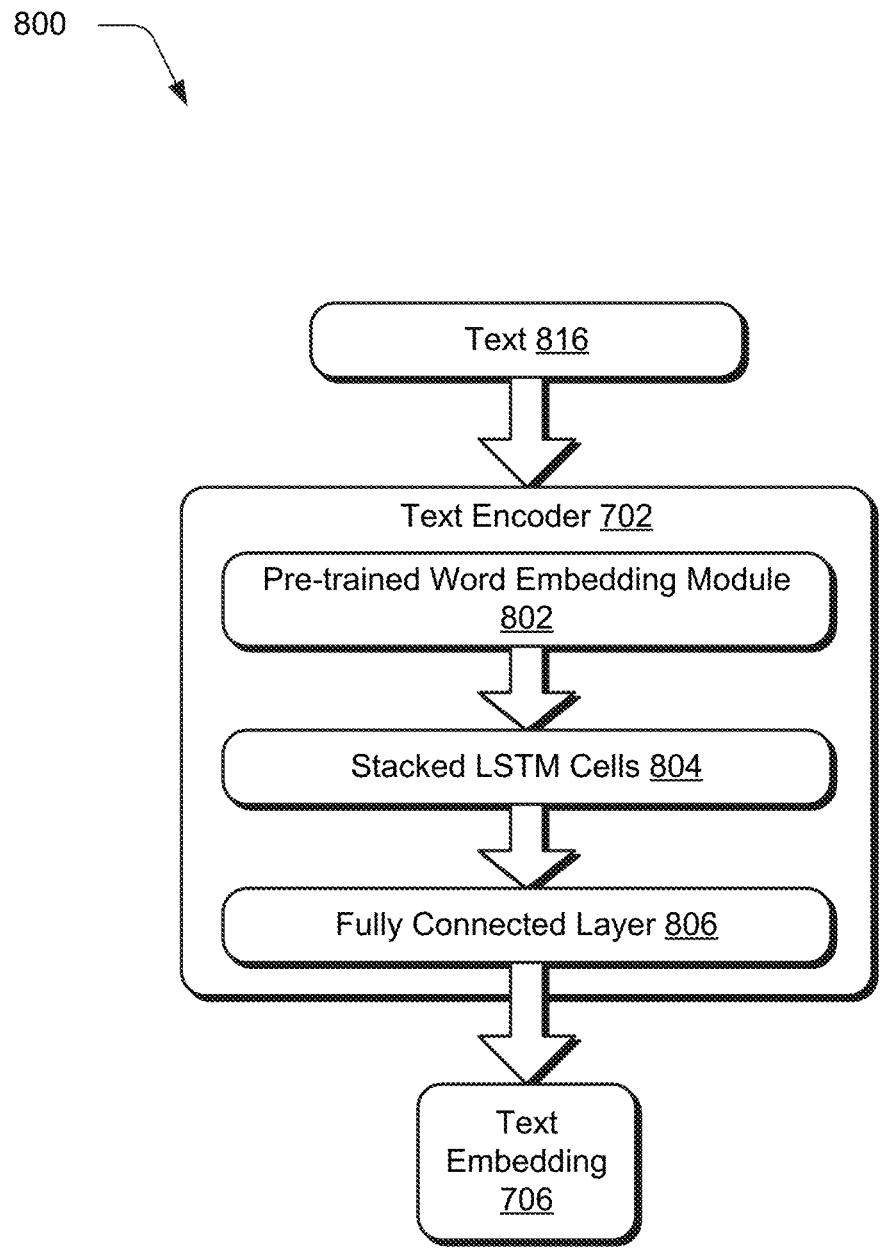
FIG. 8 depicts a system showing operation of a text embedding module of FIG. 7 in greater detail to generate a text embedding from text associated with the positive digital image samples.
Figure 9:
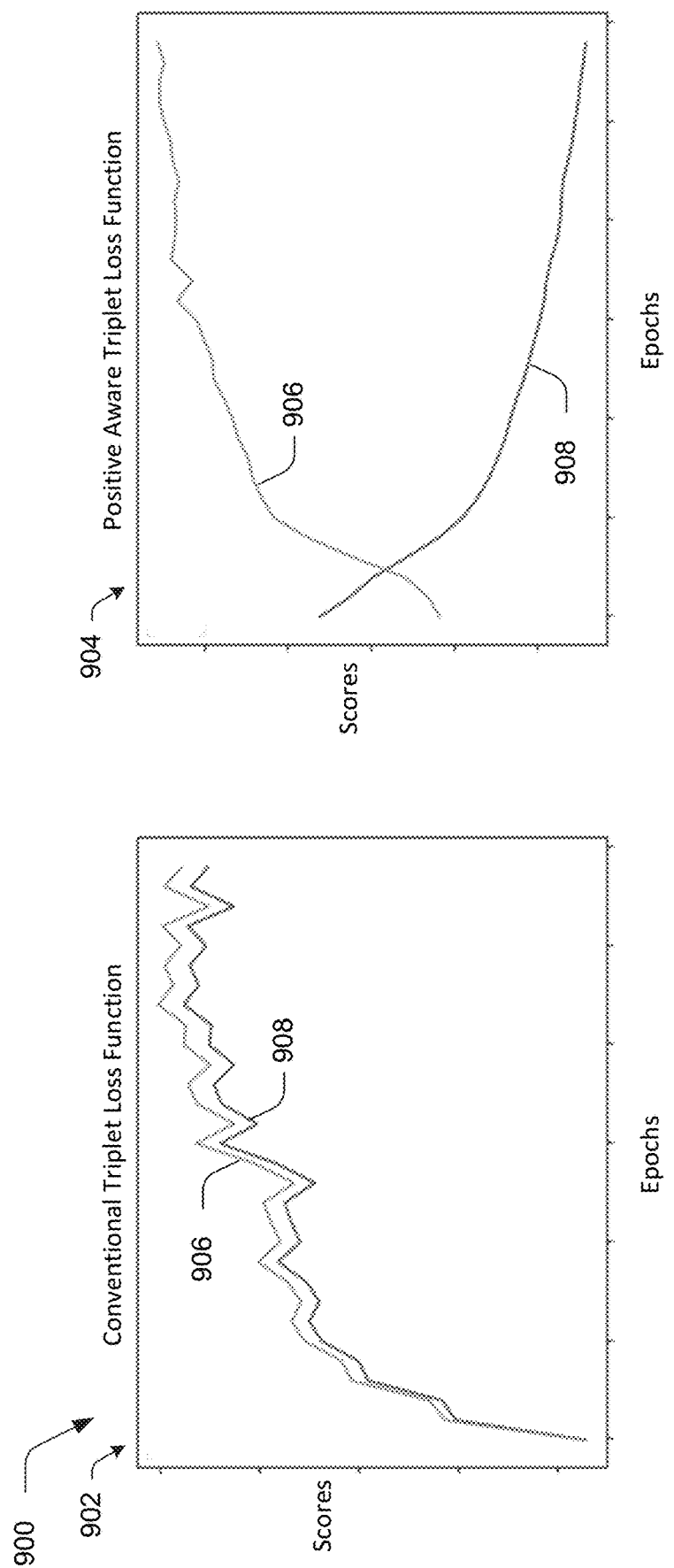
FIG. 9 depicts a graphical comparison between a conventional triplet loss and a positive aware triplet ranking loss as described herein.
Figure 10:
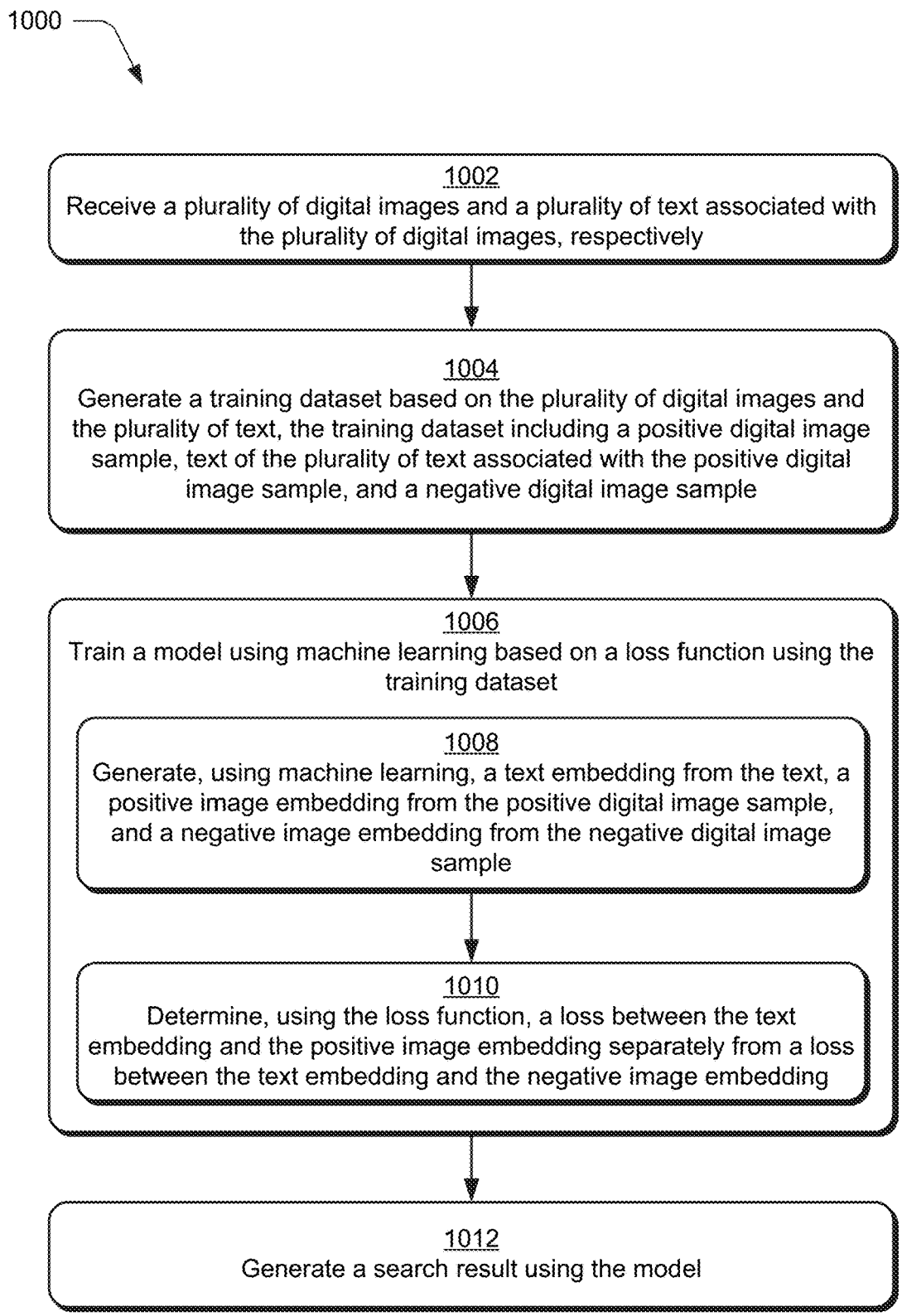
FIG. 10 depicts a procedure in an example implementation in which a model is trained based on a loss function that addresses a loss between a text embedding and a positive image embedding separately from a loss between the text embedding and a negative image embedding.

FIG. 6 depicts a system 600 in an example implementation showing multi-task training of a model 120 by a machine-learning training module 130 using multi-task training based on a query-based training dataset 202 and a title-based training dataset 422. FIG. 7 depicts a system 700 showing operation of the machine-learning training module 130 in greater detail as generating embeddings and using the loss function 132. FIG. 8 depicts a system 800 showing operation of a text embedding module of FIG. 7 in greater detail to generate a text embedding from text associated with the positive digital image samples. FIG. 9 depicts a graphical 900 comparison between a conventional triplet loss and a positive aware triplet ranking loss as described herein. FIG. 10 depicts a procedure 1000 in an example implementation in which a model is trained based on a loss function that addresses a loss between a text embedding and a positive image embedding separately from a loss between the text embedding and a negative image embedding.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeably to FIGS. 1 and 6-10.

As previously described, a multi-task training approach may be taken in training the model 120 by the machine-learning training module 130. This is performed in FIG. 6 through use of a training dataset 128 that includes a query-based training dataset 202 and a title-based training dataset 422. Each of these datasets include respective triplets 602, 604 of positive digital image samples, text associated with respective positive digital image samples, and negative digital image samples as described in the previous section. In this way, the machine-learning training module 130 is configured to capture user intention from the query-based training dataset 202 regarding association of text queries with respective digital images and also create embeddings for long sequences of text (e.g., sentences) using the title-based training dataset 422. The model 120, once trained, is therefore able to address text and text sequences with increased efficiency and accuracy, e.g., to address differences in "girl cat" and "girl holding a cat."

As part of this, the machine-learning training module 130 generates a single unified text-and-digital image embedding space 122, to which, the digital images and associated text are projected, together. The machine-learning training module 130, for instance, may leverage pre-trained architectures that are trained on a large corpus of digital images to predict tags, examples of which include VGG-19, ResNet-152, ResNet-50, and so on. A layer positioned before a last activation layer in these architectures (i.e., a SoftMax layer), for instance, may be leveraged by the machine-learning training module 130 as the common image-based embedding space. To do so, a modified version of a triplet loss is used as a loss function 132 to train the model 120.

FIG. 7 depicts a system 700 showing operation of the machine-learning training module 130 in greater detail as generating embeddings and using the loss function 132 to train a model 120. Continuing with the previous example, the machine-learning training module 130 is configured to perform multi-tasking training in which samples are taken from the query-based training dataset 202 and title-based training dataset 422, separately. The samples, for instance, may form a triplet that includes a positive digital image sample, text associated with the positive digital images sample, and a negative digital image sample generated based on the positive digital image sample.

Thus, service provider system 102 may, as described above, receive a plurality of digital images and a plurality of text associated with the plurality of digital images, respectively (block 1002), e.g., text queries, titles, and so on. A training data generation module 126 is then utilized to generate a training dataset 128 based on the plurality of digital images and the plurality of text. The training dataset 128 includes a positive digital image sample, text of the plurality of text associated with the positive digital image sample, and a negative digital image sample (block 1004). The training dataset 128 is then output by the training data generation module 126 and received as an input by the machine-learning training module 130.

The machine-learning training module 130 trains the model 120 using machine learning based on a loss function 132 (block 1006) using the training dataset 128. The machine-learning training module 130 begins the training of the model 120 by forming embeddings (e.g., vectors) for the text and digital images through use of a text encoder 702 and a digital image encoder 704 to generate a text embedding 706 and positive and negative image embeddings 708, 710, respectively (block 1008). The text encoder 702 in the illustrated example generates the text embedding 706 (e.g., a vector having a length of 2048) based on the text using a recurrent neural network (RNN) language encoder 712. The RNN is type of neural network in which connections between nodes for a directed graph along a temporal sequence and may use an internal state to process sequences of inputs. In this way, the text embedding 706 may capture an order of text, e.g., within a text query or text input, which is not possible in tag-based approaches.

FIG. 8 depicts a system 800 showing an example of operation of the text encoder 702 in greater detail. The text encoder 702 includes a pre-trained word embedding module 802 having a dictionary containing an embedding for text within a particular language, an example of which is known as "Fasttext." Word embeddings generated by the pre-trained word embedding module 802 provide semantic information regarding the text to the model.

An output of the pre-trained word embedding module 802 is then provided to a collection of stacked long short-term memory (LSTM) cells 804 to capture sequential information of the text, one to another. The output of the last cell of the stacked LSTM cells 804 is output to a fully connected layer 806 to convert the vector size (e.g., from 300 to 2048), which results in the text embedding 706. This may be utilized by the machine-learning training module 130 to generate the text embedding for text queries of the query-based training dataset 202, titles of the title-based training dataset 422, and so on.

The digital image encoder 704 in the illustrated example of FIG. 7 is configured to generate the positive and negative image embeddings 708, 710 (e.g., vectors) using a convolutional neural network (CNN) image encoder 714. The CNN image encoder 714 includes a series of pre-trained convolution layers with filters and pooling layers to extract and learn features of the digital images in order to generate the embeddings in an image embedding space. As a result, the text embedding 706 and the positive and negative image embeddings 708, 810 are usable directly as part of the single unified text-and-digital image embedding space 122 implemented by the model 120.

Once the text embedding 706 and the positive and negative image embeddings 708, 710 are generated, a loss function 132 is utilized to train the model 120. The loss function 132 of the machine-learning training module 130 is configured to determine a loss between the text embedding and the positive image embedding separately from a loss between the text embedding and the negative image embedding (block 1010).

The loss function 132 as illustrated in FIG. 7, for instance, includes an L2 716 loss (e.g., squared distance) that is used to determine a loss between the text embedding 706 and the positive image embedding 708 separately from an L2 718 (e.g., squared distance) loss determined between the text embedding 706 and the negative image embedding 710. This is referred to as a "Positive Aware Triplet Ranking Loss" in the current discussion, which may be expressed as follows:

$$\text{Positive aware triplet ranking loss} = s_p + \max(0, \text{margin} - s_n)$$

in which a square distance between the positive image embedding 708 and the text embedding 706 is "$s_p$" and a square distance between the negative image embedding 710 and the text embedding 706 is "$s_n$".

Conventional triplet loss functions are configured to minimize "$s_p - s_n$" by increasing a value of both "$s_p$" and "$s_n$". Therefore, in the conventional triplet loss function as both values increase, the difference automatically increases. However, in the positive aware triplet ranking loss illustrated as the loss function 132 described herein, the losses are addressed separately. Therefore, the positive aware triplet ranking loss is configured to minimize "$s_p$" (i.e., a loss between the text embedding 706 and the positive image embedding 708) separately from maximizing "$s_n$," i.e., a loss between the text embedding 706 and the negative image embedding 710. This causes the positive image embeddings 708 to increase similarity to the text embedding 706, e.g., to lie in a same cluster, and at the same time tighten clusters by maximizing "$s_n$", i.e., to increase dissimilarity to the negative image embedding.

In instances in which multiple negative samples are employed, the machine-learning training module 130 selects a top "N" samples with a least square distance that are not rejected (e.g., filtered), instead of a top sample. The loss function 132 may then be expressed as:

$$\text{Positive aware triplet ranking loss} = s_p + \Sigma i(\max(0, \text{margin} - S_{ni})).$$

In an implementation, a number of samples is increased by a defined number at a defined point in time, such as every ten epochs.

FIG. 9 depicts a graphical example 900 contrasting losses calculated using a conventional triplet loss function 902 and a positive aware triplet loss function 904 as described above. As illustrated, differences between a negative loss 906 and a positive loss 908 track each other for the conventional triplet loss function 902. This is because conventional triplet loss functions are configured to minimize "$s_p - s_n$" by increasing a value of both "$s_p$" and "$s_n$". Therefore, in the conventional triplet loss function as both loss values increase, the difference tracks these increases.

However, a difference between the negative loss 906 and the positive loss 908 for the positive aware triplet loss function 904 increase over time as the positive loss is minimized and the negative loss is maximized. In other words, during training a distance between the positive image embedding 708 and the text embedding 706 reduces over time while a distance between the negative image embedding 710 and the text embedding 706 increases. In instances of multi-task training, the post aware triplet loss function may implement different margins for losses employed for query-based training dataset 202 and the title-based training dataset 422. The L2 losses 716, 718 are then averaged as loss 720 in FIG. 7 and back propagated 722 through the network, e.g., to train the text encoder 702 to utilize an image embedding space of the digital image encoder 704. The model 120, once trained, may be used to support a variety of functionality, such as to generate a search result (block 1012), digital image retrieval, machine transition, text retrieval, speech recognition, text summarization, and so forth such that visual intuition is supported in these techniques to address "what" is being expressed visually in the text.

Thus, as described above the text-to-visual machine learning embedding techniques are configured to overcome the challenges of conventional techniques in a variety of ways. These techniques include use of query-based training data which may expand availability and types of training data usable to train a model. The use of query-based training data may also be expanded through use of title-based training data as part of multi-task learning, which improves training accuracy by limiting noise in the query-based training data and supports use of long text sequences.

Generation of negative digital image samples is also described that increases accuracy in training the model using machine learning by having a semantic and/or visual meaning that is similar to a positive digital image sample, but does not have the exact same components of the positive digital image sample. This training data may then be used to generate a model supporting a single unified text-and-digital image embedding space that is configured to treat text and digital images as the same entity, and thus overcomes the limitations of conventional techniques that are solely text based.

A loss function is also described that also supports increased accuracy and computational efficiency by treating a less calculated between a positive image embedding generated from a positive digital image sample and a text embedding calculated based on text associated with the positive digital image sample separately from a negative image embedding generated from a negative digital image sample and the text embedding. This permits a distance between the positive image embedding and the text embedding to reduce over time while a distance between the negative image embedding and the text embedding increases, thereby increasing model accuracy.

Example System and Device

Figure 11:
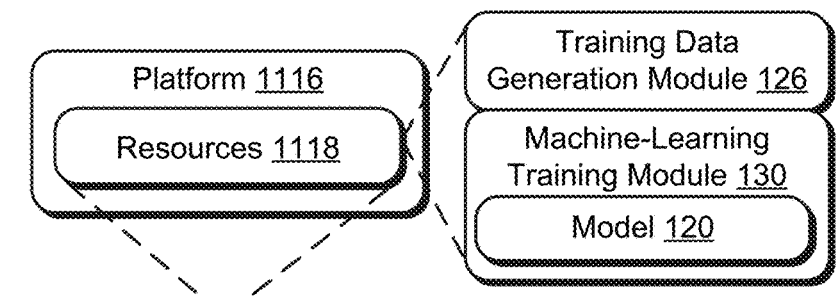
FIG. 11 illustrates an example system including various components of an example device that can be implemented as any type of computing device as described and/or utilize with reference to FIGS. 1-10 to implement embodiments of the techniques described herein.
Figure 11:
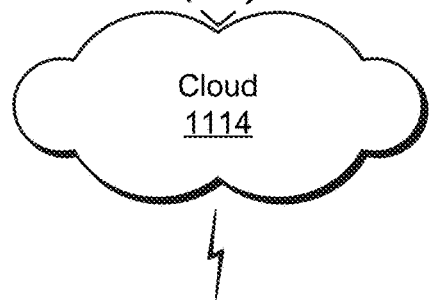
Figure 11:
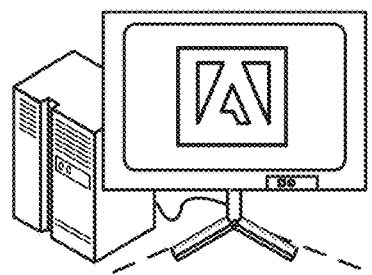
Figure 11:
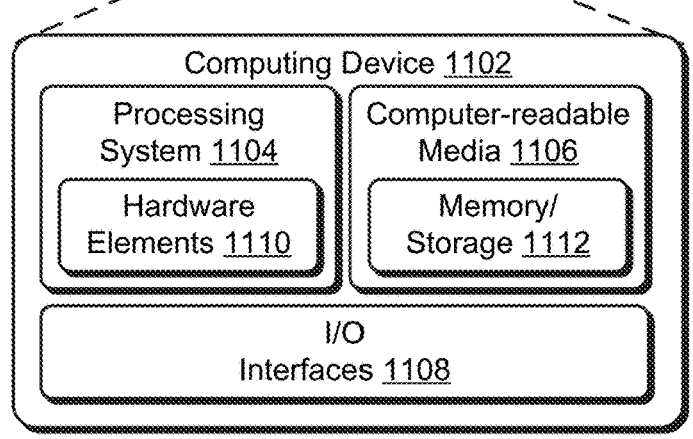

FIG. 11 illustrates an example system generally at 1100 that includes an example computing device 1102 that is representative of one or more computing systems and/or devices that may implement the various techniques described herein. This is illustrated through inclusion of the training data generation module 126, and machine-learning training module 130, and the model 120. The computing device 1102 may be, for example, a server of a service provider, a device associated with a client (e.g., a client device), an on-chip system, and/or any other suitable computing device or computing system. Further, the computing device 1102 may implement the platform 1116 and resources.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a search module implemented at least partially in hardware to generate a plurality of search results having digital images, the plurality of search results resulting from searches performed using a plurality of text queries, respectively;
a training data generation module implemented at least partially in hardware to generate a training dataset, the training data generation module including:
a positive sample generation module configured to select a positive digital image sample from the digital images, the positive digital image sample selected from a first search result of the plurality of search results; and
a negative sample generation module configured to:
generate a subset of the digital images by filtering the digital images based on at least one item of text associated with the positive digital image sample, the subset including the digital images that are not associated with the at least one item of text; and
select a negative digital image sample from the subset of the digital images, the negative digital image sample not included in the first search result and selected from a second search result of the plurality of search results; and
a machine-learning training module implemented at least partially in hardware to train a model as part of machine learning based on the training dataset to perform an image search.

2. The system as described in claim 1, wherein the training of the model results in a single unified text-and-digital image embedding space based on the plurality of text queries and the digital images.

3. The system as described in claim 1, wherein the machine-learning training module is configured to train the model using a loss function that defines a first loss between the at least one item of text and the positive digital image sample separately from a second loss between the at least one item of text and the negative digital image sample.

4. The system as described in claim 1, wherein the first search result is generated from a first search query of the plurality of text queries, and the second search result is generated from a second search query of the plurality of text queries, the second search query including at least two items of text also included as part of the first search query.

5. The system as described in claim 1, wherein the machine-learning training module is configured to generate a positive image embedding from the positive digital image sample, a text embedding from a text query of the plurality of text queries that is associated with the positive digital image sample, and a negative image embedding from the negative digital image sample.

6. The system as described in claim 5, wherein the machine-learning training module is configured to train the model using a triplet loss function that addresses a first loss between the text embedding and the positive image embedding separately from a second loss between the text embedding and the negative image embedding.

7. A method implemented by a computing device, the method comprising:
receiving, by the computing device, a plurality of digital images and a plurality of text associated with the plurality of digital images, respectively;
generating, by the computing device, a training dataset based on the plurality of digital images and the plurality of text, the training dataset including a positive digital image sample, text of the plurality of text associated with the positive digital image sample, and a negative digital image sample; and
training, by the computing device, a model using machine learning based on the training dataset to perform image searches, the training using a loss function that defines a loss between the text and the positive digital image sample separately from a loss between the text and the negative digital image sample.

8. The method as described in claim 7, wherein a distance of the loss between the text and the positive digital image sample decreases and a distance of the loss between the text and the negative digital image sample increases during the training.

9. The method as described in claim 7, wherein the training trains the model to implement a single unified text-and-digital image embedding space based on the plurality of text and the plurality of digital images.

10. The method as described in claim 7, wherein the positive digital image sample is selected from a first search result of a plurality of search results and the negative digital image sample is selected from a second search result of the plurality of search results other than the first search result.

11. The method as described in claim 7, wherein the training dataset includes:
   a first training dataset that is a query-based training dataset and includes a plurality of text queries used to initiate a plurality of digital image searches and an associated plurality of digital images that are user selected from search results generated by the plurality of digital image searches; and
   a second training dataset is a title-based training dataset and includes a corresponding plurality of digital images and titles associated with the corresponding plurality of digital images.

12. The method as described in claim 11, wherein a loss for the training dataset is calculated by averaging the loss for the query-based training dataset with a loss for the title-based training dataset.

13. A method implemented by a computing device, the method comprising:
   receiving, by the computing device, a plurality of digital images and a plurality of text associated with the plurality of digital images, respectively;
   generating, by the computing device, a training dataset based on the plurality of digital images and the plurality of text, the training dataset including:
      a positive digital image sample;
      at least two terms of text of the plurality of text associated with the positive digital image sample; and
      a negative digital image sample also associated with the at least two terms of text of the plurality of text, the negative digital image sample not included in a search result used to locate the positive digital image sample; and
   training, by the computing device, a model using machine learning based on the training dataset to perform image searches, the training using a loss function that is configured to minimize a first loss between the at least two terms of text and the positive digital image sample separately from maximizing a second loss between the at least two terms of text and the negative digital image sample.

14. The method as described in claim 13, wherein the plurality of text is titles associated with respective digital images of the plurality of digital images.

15. The method as described in claim 13, wherein the training includes generating a positive image embedding from the positive digital image sample, a text embedding from the at least two terms of text associated with the positive digital image sample, and a negative image embedding from the negative digital image sample.

16. The method as described in claim 13, wherein the training uses a triplet loss function.

17. The method as described in claim 13, further comprising:
   selecting the positive digital image sample from a first search result of a plurality of search results; and
   selecting the negative digital image sample from a second search result of the plurality of search results other than the first search result.

18. The method as described in claim 13, wherein the training dataset includes:
   a first training dataset that is a query-based training dataset and includes a plurality of text queries used to initiate a plurality of digital image searches and a plurality of digital images that are user selected from search results generated by the plurality of digital image searches; and
   a second training dataset is a title-based training dataset and includes a corresponding plurality of digital images and titles associated with the corresponding plurality of digital images.

* * * * *